Sept. 3, 1957     J. A. BUTCKO ET AL     2,804,914

SEAT ROLLER COVER

Filed Oct. 27, 1953

INVENTOR.
Joseph A. Butcko
BY Allen N. Claw Jr.
Thos. Donnelly
ATTORNEY

United States Patent Office 2,804,914
Patented Sept. 3, 1957

2,804,914

SEAT ROLLER COVER

Joseph A. Butcko and Allen N. Clow, Jr., Ypsilanti, Mich.; said Clow assignor to Stanley R. Underwood, Ypsilanti, Mich.

Application October 27, 1953, Serial No. 388,472

6 Claims. (Cl. 155—183)

Our invention relates to a new and useful improvement in a seat roller cover, adapted for use primarily on automobile seats so that the seat may be easily and quickly covered before a person occupies the same. Frequently, the clothes of a person are in such condition that they would stain or dirty the upholstery of the automobile seat, or the person who occupied the seat before may have contaminated the upholstery through contact with his clothing.

It is the object of the present invention to provide a structure whereby the upholstery of an automobile seat, including the back thereof, may be easily and quickly covered for the desired protection.

Another object of the invention is the provision in a mechanism of this class of a roller to which, and from which, the seat covering material may be easily and quickly wound.

In some automotive vehicles the seat may be adjusted lengthwise of the vehicle, and particularly is this so with the front seat of an automobile.

It is another object of the invention to provide in a mechanism of this class a structure whereby a roller, on which the seat covering material is wound, may automatically retain its operative position relative to the vehicle seat regardless of the longitudinal adjustment of the seat in the vehicle.

Another object of the invention is the provision of a mechanism having a roller to which seat covering material is wound and so mounted that the roller will move forwardly and backwardly as the vehicle seat is moved forwardly and backwardly to the vehicle body.

Other objects of the invention will appear hereinafter.

It is recognized that various modifications and changes may be made in the details of the structure listed without departing from the invention, and it is intended that the present disclosure shall be considered to be but the preferred embodiment.

Forming a part of this application are drawings in which.

Figure 1:
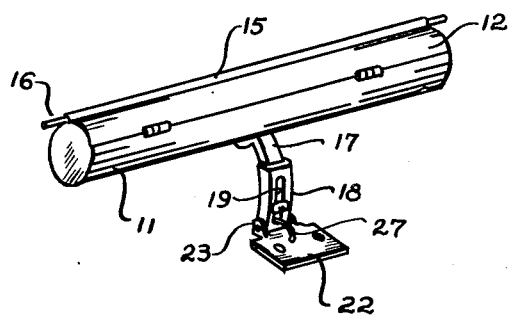
Fig. 1 is a perspective view of the invention.
Figure 4:
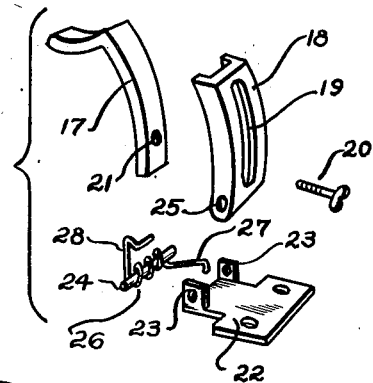
Fig. 4 is an exploded view of the mounted mechanism shown in perspective.
Figure 2:
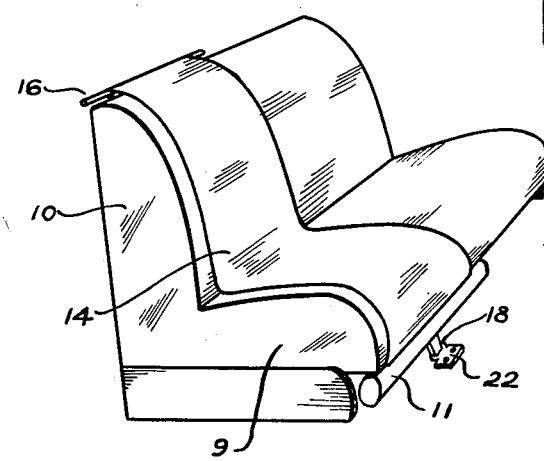
Fig. 2 is a perspective view of the invention showing it applied to a vehicle seat.

In the drawings we have shown a vehicle seat having a side portion 9 and back portion 10.

The invention comprises a housing 11, having a hinged cover 12 whereby access to the interior of the housing may be had. Rotatively mounted in this housing 11 is a spring roller 13, on which a flexible seat covering material 14 is used. On the end of this seat covering material is formed a sleeve 15, in which is inserted a rigid bar 16.

Mounted at one end of the housing 11 is a supporting arm 17, which slideably engages with the channel bar 18 having a slot 19 formed therein. Projectible through this slot 19 is a screw 20, which threads in the opening 21 formed in the arm 17. Thus, the position of the arm 17 lengthwise of the channel bar 18 may be adjusted, and these two parts secured in fixed relation.

Mounted on the floor of the vehicle body is a plate 22, having a pair of spaced apart, upstanding lugs 23, between which is pivotally mounted the channel bar 18 by means of a pivot pin 24 extending through the opening 25 in the channel bar.

Embracing the pin 24 is a coil spring 26, one end 27 of which bears against the upper surface of the plate 22, and the other end 28 of which is attached to the arm 17 so as to normally rock the members 17 and 18 away from the plate 22 and maintain the housing 11 positioned in engagement with the seat 9 at its forward edge.

Should the seat 9 be moved forwardly from its rearmost position, the arm 17 will rock forwardly against the compression of the spring 26. In this manner housing 11, which contains the roller, will automatically adjust itself longitudinally to the body of the vehicle upon relatively longitudinal movements of the body and the vehicle seat.

When it is desired to use the seat cover, the fabric 14 is unrolled from the roller 13 on a rigid rod and then permitted to hang downwardly at the back of the seat at the upper edge thereof.

Figure 5:
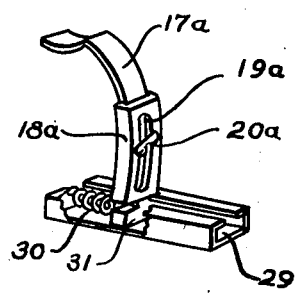
Fig. 5 is a perspective view of a modified form of the mounting with parts broken away.
Figure 3:
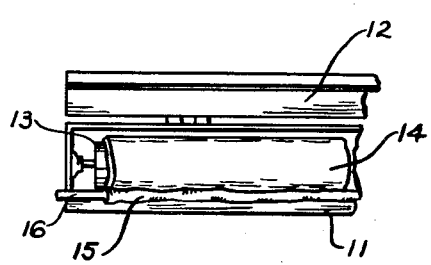
Fig. 3 is a fragmentary side view with parts broken away.

In Fig. 5, we have shown a slight modification in which the channel plate 29 is substituted for the plate 22 and suitably secured to the floor of the vehicle body.

Extending downwardly from the channel bar 18a is a T-head 31, which engages with the channel of the part 29, and is slideable lengthwise thereof.

The coil spring 30 is used to maintain this T-head 31 slide rearwardly so as to maintain the housing 11 in proper relative position to the vehicle seat portion 9. As the seat is moved forwardly from its rearmost position, the supporting bar 18a with its connecting parts, which comprises the arm 17a and screw 20a extending through the slot 19a, are slid forwardly against the tension of the spring 30. Upon the rearward movement of the seat, the T-head will slide rearwardly.

What we claim is:

1. In a seat covering device of the class described, for use with a forwardly and rearwardly movable vehicle seat which is mounted in a vehicle body having a floor, a housing; means for mounting said housing on said floor, forwardly to the seat; a spring roller mounted in said housing; a flexible covering wound on said roller and unwindable therefrom into position for covering the seat; a means for adjusting the vertical position of said housing relatively to said floor; and a means for simultaneous movement of said housing forwardly or rearwardly to the vehicle upon the movement of said seat forwardly or rearwardly to the vehicle, and to the same degree.

2. In a seat covering of the class described, for use with a forwardly and rearwardly movable vehicle seat which is in a vehicle body having a floor, a plate secured to said floor; a supporting arm moveably mounted on said plate and projecting upwardly therefrom; a housing mounted on the upper end of said arm; a spring roller mounted in said housing; a flexible seat covering wound on said roller and unwindable therefrom into position for covering the seat; and a means for maintaining said housing in operative relative position to the seat upon movement of the seat to various positions longitudinally to the floor.

3. In a seat covering of the class described, for use with a forwardly and rearwardly movable vehicle seat which is mounted in a vehicle body having a floor, a plate secured to said floor; a supporting arm moveably mounted on said plate and projecting upwardly therefrom; a housing mounted on the upper end of said arm; a spring roller mounted in said housing; a flexible seat covering wound on said roller and unwindable therefrom into position for covering the seat; a means for maintaining said housing in operative relative position to the seat, upon movement of the seat to various positions longitudinally to the floor; and a means for adjusting the height of said housing relatively to the floor.

4. In a seat covering device of the class described for use with a vehicle seat mounted in a vehicle body having a floor, and moveable rearwardly and forwardly of the body to various positions, a plate mounted on the floor forwardly of the seat; a supporting bar pivotally mounted at one end of said plate and projecting upwardly therefrom; a supporting arm projecting upwardly from said bar and adjustable lengthwise thereof; a housing mounted on the upper end of said arm; a spring roller in said housing; a flexible seat covering material wound on said roller and unwindable therefrom into position for covering the seat; and a means for maintaining said arm swung to position for maintaining said housing in operative relative position to said seat upon movement of said seat rearwardly or forwardly of the body.

5. In a seat covering device of the class described for use with a vehicle seat mounted in a vehicle body having a floor, a plate mounted on said floor forwardly of the seat; a supporting bar pivotally mounted at its lower end to said plate and projecting upwardly therefrom; a supporting arm mounted on said bar, adjustable longitudinally thereof, and projecting upwardly therefrom; a housing mounted on the upper end of said arm; a spring roller mounted in said housing; a flexible seat covering wound on said roller and unwindable therefrom for covering the seat; and spring means for maintaining said supporting arm rocked rearwardly into engagement with the forward side of said seat.

6. In a seat covering device of the class described for use with a forwardly and rearwardly movable vehicle seat which is mounted in a vehicle body having a floor, a guide means mounted on said floor in fixed relation thereto; a supporting bar slideable at one end to said guide means rearwardly and forwardly of the vehicle body; a housing carried by said bar; spring means for normally maintaining said bar to slide to position for maintaining said bar in engagement with the seat at the forward edge thereof, upon movement of said seat to various positions longitudinally of the body; a spring roller in said housing; and a flexible material wound on said roller and unwindable therefrom into position for covering the seat.

References Cited in the file of this patent

UNITED STATES PATENTS

| | | |
|---|---|---|
| 327,022 | Ross | Sept. 29, 1885 |
| 554,934 | Johnson et al. | Feb. 18, 1896 |
| 588,836 | Raymond | Aug. 24, 1897 |
| 1,238,581 | Shannon | Aug. 28, 1917 |
| 1,470,373 | Barrier | Oct. 9, 1923 |
| 1,985,222 | Menhall | Dec. 18, 1934 |
| 2,467,468 | Duby et al. | Apr. 19, 1949 |